United States Patent Office 2,760,961
Patented Aug. 28, 1956

2,760,961

PREPARATION OF MELAMINE

Johnstone S. Mackay, Pittsburgh, Pa., assignor to American Cyanamid Company, New York, N. Y., a corporation of Maine No Drawing. Application September 18, 1953,
Serial No. 381,128

6 Claims. (Cl. 260—249.7)

The present invention concerns the preparation of cyanamide and certain of its polymers, and more particularly is directed to the preparation of melamine.

It has been found that when urea or biuret is heated in contact with an inert, inorganic heat-stable highly porous adsorbent of high surface area such as silica gel at a temperature of at least 220° C. a reaction mass is formed containing melamine and/or cyanamide, from which these products may be recovered in various ways customary in the art.

This is a continuation-in-part of my co-pending application Serial No. 267,007, filed January 17, 1952, now abandoned.

The following examples illustrate the invention.

EXAMPLE 1

Into a 1 liter Florence flask was charged 50 g. of silica gel. This silica gel contained several percent adsorbed water vapor, but did not prevent its catalytic operation. Powdered urea (¼ mol, 15 g.) was then added to the silica gel and the two materials mixed by swirling the flask for a few minutes. The flask was heated on a sand bath, the surface temperature of which (as measured by a thermocouple) was approximately 340–360° C. As the reaction mass was brought up to reaction temperature, water vapor began to condense on the upper portion of the flask. The flask was left on the sand bath for 20 minutes, after which it was removed and allowed to cool. The flask (and contents) was then washed with hot water and the slurry filtered hot. The filtrate was tested for cyanamide and melamine by the well-known silver nitrate and picrate methods respectively. A fair yield of both was obtained. A small amount of dicyandiamide was also found.

Instead of leaching the reaction mass with water alone, it can be first extracted with ether (in which cyanamide is soluble, but in which dicyandiamide and melamine are insoluble), followed by aqueous extraction to recover the two latter compounds separate from cyanamide. The latter aqueous extraction is made hot in the known way, and the filtrate allowed to cool, whereupon melamine crystalizes from solution. The residual solution containing dicyandiamide can then be concentrated and evaporated to recover its dicyandiamide.

Melamine can also be recovered from the silica gel reaction mass by other means well known to those skilled in the art. A preferred method is to sublime it off the gel with hot ammonia.

EXAMPLE 2

69 grams of silica gel were heated overnight in a muffle furnace at 600° C. to remove surface moisture whereby the silica lost approximately 4% in weight, providing 66 grams of material. This silica was mixed with 33 grams of urea and the mixture was placed in a vertical reaction column 30 inches high by ¾" in diameter. The mixture was supported approximately ⅔ of the way down in the column, where it occupied a vertical space about 20" long. The column was equipped at the top with an ammonia inlet port and with a vapor exit at the bottom discharging into a melamine collection vessel maintained at about 100° C. The collection vessel caused melamine vapor to deposit therein as solid while simultaneously permitting byproduct carbon dioxide together with ammonia to pass through without solidification as ammonium carbamate. At the beginning of the reaction the ammonia inlet port was opened so that ammonia vapor swept slowly through the reaction mixture at the rate of about one liter of ammonia per minute measured at room temperature. At the same time the vertical reaction tube, which was heated by means of electrical resistance, was brought to reaction temperature as rapidly as possible. Under the conditions given in this example approximately 0.75–1.0 hour was required to bring the mixture to the operating temperature of 275°–375° C. The temperature was measured by means of a thermocouple well in the center of the reaction charge. The first trace of melamine appeared in the collection chamber when the thermocouple registered about 190° C., and increased in recovery per unit time as the converter became hotter. In a 24-hour reaction period, the bulk of the 8g. of melamine was collected in the receiver. The silica was then removed, mixed with 40 g. urea, and heated in ammonia for another 5 hours, yielding an additional 12.2 g. of melamine. The cycle was repeated a number of times, as shown in the following table.

*Table I*

[Consecutive additions of urea to same silica gel catalyst (66 g., 58–60 mesh). Reaction temperature 275–375° C.–NH₃, 1 liter/minute.]

| Day | Clock Time | Urea, added, g. | Cumulative urea, g. | Melamine out, g. | Cumulative melamine, g. |
|---|---|---|---|---|---|
| 1 | 12:00 N | 33 | 33 | | |
| 2 | 12:00 N | 0 | 33 | 8 | 8 |
| 2 | 12:00 N | 40 | 73 | | |
| 2 | 5 P. M. | 0 | 73 | 12.2 | 20.2 |
| 5 | 9 A. M. | 0 | 73 | 2.8 | 23.0 |
| 5 | 9 A. M. | 42 | 115 | | |
| 5 | 1 P. M. | 0 | 115 | 10.1 | 33.1 |
| 5 | 1 P. M. | 25 | 140 | | |
| 5 | 4 P. M. | 0 | 140 | 6.59 | 39.6 |
| 5 | 5 P. M. (Shut Down) | 0 | 140 | 1.55 | 41.2 |
| 6 | 9 A. M. (Start Up) | 43 | 183 | | |
| 6 | 1 P. M. | 0 | 183 | 13.7 | 54.9 |
| 6 | 1 P. M. | 25 | 208 | | |
| 6 | 4 P. M. | 0 | 208 | 9.85 | 64.8 |
| 7 | 9 A. M. | 0 | 208 | 5.0 | 69.8 |
| 7 | 9 A. M. | 42 | 250 | | |
| 7 | 1 P. M. | 0 | 250 | 11.5 | 81.3 |
| 7 | 1 P. M. | 25 | 275 | | |
| 7 | 4:30 P. M. | 0 | 275 | 6.65 | 88.0 |
| 8 | 9 A. M. | 0 | 275 | 5.2 | 93.2 |
| 8 | 9 A. M. | 44 | 319 | | |
| 8 | 1 P. M. | 0 | 319 | 11.0 | 104.2 |
| 8 | 1 P. M. | 31 | 350 | | |
| 8 | 4:30 P. M. | 0 | 350 | 10.0 | 114.2 |
| 9 | 9 A. M. | 0 | 350 | 2.7 | 116.9 |
| 9 | 5 P. M. | (¹) | (¹) | (¹) | (¹) |
| 12 | 9 A. M. | (²) | (²) | (²) | (²) |
| 13 | 9 A. M. | 0 | 350 | 4.0 | 120.9 |

¹ Turned off heat and NH₃.
² Turned on heat and NH₃.

EXAMPLE 3

The apparatus consisted of a 1-liter flat-bottom, 4-necked stainless steel flask. It was equipped with a centered metal stirrer adapted to scrape the bottom of the flask lightly during rotation. About 150 g. of dry silica gel was placed in the flask following positioning of the stirrer. A second neck of the flask was used to introduce NH₃ preheated to about 400° C. The third neck was fitted with a liquid urea feed and the fourth with a vapor effluent line leading to a second flask maintained at 100° C. to condense vapor melamine to solid melamine and to pass the residual NH₃ and CO₂ to an ammonium carbamate recovery unit.

The melamine synthesis flask was heated in an electric jacket to 400° C., while continuously stirring at about 50 R. P. M., and the NH₃ and urea feeds opened.

The urea feed rate was maintained at about 45 g./hr. and NH₃ at about 3 liters/minute for 5 hours. Melamine recovered was 12.6 g.

EXAMPLE 4

Using substantially the same apparatus and procedure as in Example 3, 10 g. of biuret was fed through a solids addition tube to 50 g. of silica gel over a period of about 1 hour, and nearly 4 g. of melamine was condensed from the effluent.

EXAMPLE 5

The reactor used in this run comprised a heat resistant glass tube 24 inches long by 1 inch in diameter, heated at about 350° C. by means of resistance wire. A mixture of urea and silica gel was fed into one end of the tube from an overhead hopper and pushed slowly through the tube by means of a screw conveyor. Ammonia at the rate of 1 liter per minute was passed co-currently through the advancing charge. The vapor effluent was passed through a melamine condensing flask maintained at 100° C., in which melamine condensed on the walls. As the initial charge, 300 g. of silica gel, the bulk of which was 28–60 mesh, was mixed with 200 g. of urea, and this mixture passed through the reactor over a period of eight hours, during which 55 g. of melamine was collected. The residual catalyst was allowed to fall into a collecting flask underneath the terminal end of the furnace. At the end of the first run it was withdrawn, admixed with 100 g. of urea, and the mixture passed through the reactor under the same conditions as before, providing an additional 27 g. of melamine.

The following table summarizes experiments conducted in substantially the same apparatus and manner of Example 2.

was then removed, mixed with another 50 g. urea, and heated as before giving 117 g. A third treatment gave 143 g. of mixture, which analysis showed to contain much ammeline and small amounts of melamine and cyanamide. To this 143 g. was added another 50 g. portion of urea, and this mixture was heated to 350° C. for 4¾ hours in the same way, during which time 56 g. of melamine sublimed off. The rate of melamine recovery was apparently in excess of 0.25 g./hr./g. urea for several minutes when the reaction temperature passed through the range 340°–350° C., 24 g. being distilled out in 15 minutes in this range, but thereafter the rate fell, 6 g. being collected in the succeeding 15 minutes.

EXAMPLE 17

In this run urea was continuously converted to melamine in a fluidized silica gel bed. The fluidized column comprised a stainless steel tube ¾" in diameter by 60° in height. 250 g. of silica gel of the following screen analysis was placed in the column:

| Mesh range: | Percent silica |
|---|---|
| 60–100 | 15 |
| 100–200 | 35 |
| 200–325 | 35 |
| Over 325 | 15 |

This amount of silica gel occupied 36" of vertical space in the column in the position of rest, and 60" when fluidized with a stream of ammonia passed into the bed at the rate of 2.5 liters per minute. The column was heated to a temperature of 350° C. by means of electrical resistance heaters coiled about the column. The column was thermally insulated to prevent undue heat loss. The urea feed mechanism comprised a screw conveyor to permit the steady excrusion of powdered urea into the base of the column where it could be swept up into the fluidized bed by the incoming ammonia. As soon as the column attained operating temperature the introduction of urea was begun. 15 g. of urea was gradually fed into the reactor over a period of 60 minutes. The rate of feed was thereafter increased to 21 g. per hour within the next hour, after which time this feed rate was continued for an

| Run No. | Dry silica gel, g. | Reactant, g. | | Sweep gas, liter/min. | | Reaction temp., °C. | Time at reaction temp. | Time in heating from room temp. to reaction temp., min. | Melamine condensed from vapor effluent, g. |
|---|---|---|---|---|---|---|---|---|---|
| | | Urea | Biuret | NH₃ | Other | | | | |
| 6 | 60 | 50 | | 1 | | 230 | 1 min | 25 | (¹) |
| 7 | 60 | 50 | | 1 | | 310 | 1 min | 54 | (²) (³) |
| 8 | 60 | 60 | | | N₂, 0.5 | 350 | 0.5 hr | 60 | (⁴) |
| 9 | 60 | 60 | | 1.8 | | 350 | 1.5 hrs | 75 | 17 |
| 10 | 60 | 60 | | 1 | | 345–355 | 4 hrs | 80 | 16 |
| 11 | 60 | 40 | | 1 | | 350 | 2½ hrs | 115 | 11 |
| 12 | 58 | 39 | | 0.6–0.7 | CO₂, 0.3–0.4 | 350 | 3 hrs | about 60 | 11.4 |
| 13 | 60 | 50 | | 1 | | 350–400 | 4 hrs | do | 14 |
| 14 | 60 | | 30 | ⁵1 | | 350–375 | 1⅚ hrs | do | ⁶16 |
| 15 | 60 | | 52.5 | 1 | | 350 | 5 | about 40 | 18 |

¹ Contained ammonium carbamate; no melamine in effluent but gel contained a little melamine.
² Gel residue contained much ammeline with a small amount of melamine.
³ Contained 1 g. melamine.
⁴ Contained melamine.
⁵ The NH₃ was bubbled thru 20 ml. H₂O at r. t. and the resultant vapor mixture used as a sweep gas.
⁶ Recovered as aqueous slurry by condensing some of the H₂O in effluent along with the melamine.

It is preferred to "load" the silica with as much melamine-forming material as possible, during either batch or continuous operations. The following is an example of "loading" the silica.

EXAMPLE 16

A mixture of 60 g. silica gel and 50 g. urea was heated in the apparatus of Example 2, feeding NH₃ at 1 liter/minute, until the temperature reached about 210° C. (30 minutes required). The resultant mixture (88 g.)

additional 26.5 hours. The effluent gases, comprising melamine vapor, ammonia, and carbon dioxide were led into a vessel maintained at about 100° C. to condense melamine without condensing ammonium carbamate. The melamine so recovered was extremely pure, having passed directly from the vapor phase to the solid phase. The total melamine recovered during the entire operation amounted to 157 g., 80% of theory.

The following table summarized further experiments conducted in the apparatus and manner of Example 17.

Table 3

|  | Ex. 18 | Ex. 19 | Ex. 20 | Ex. 21 | Ex. 22 |
|---|---|---|---|---|---|
| Urea, g | [1] 50 | [2] 90 | [3] 80 | [5] 133 | [5] 180 |
| Silica gel, g | 1 200 | [2] 190 | [3] 210 | 200 | 125 |
| $NH_3$ rate, L./min | 4 | 4 | 4 | 5 | 3 |
| Reaction temp., °C | 320–350 | 350 | 300–350 | 250 | 400 |
| Time at reaction temp., hr | 5.5 | 16 | 5.5 | 7 | 9 |
| Melamine condensed from effluent, g | 17 | 29 | [4] 29 | 31 | 58 |
| Yield, percent of theory | 97 | 92 | (4) | 67 | 96.6 |

[1] The urea-silica mixture was placed in the column at room temperature and heated to reaction temperature with continuous fluidization by the incoming $NH_3$.
[2] Mixture heated to 80° C. before placing in fluidizing column.
[3] To the silica catalyst remaining from Example 19 was added sufficient clean dry silica gel to bring the total weight to 210 g. The catalyst was then placed in the column and heated to reaction temperature with continuous fluidization by means of the incoming $NH_3$. The urea (fine powder) was blown into the hot catalyst gradually over the 5½ hour reaction period by charging it to the fluidizing $NH_3$.
[4] The yield includes a little melamine or the equivalent remaining on the silica from Example 19. The total yield from both Example 19 and Example 20, 58 g., was 98% of theory.
[5] Fed to fluidizing $NH_3$ gradually over the reaction period.

The operation of the process is not confined to atmospheric pressure conditions. The reaction apparently proceeds independently of pressure, and can be conducted under sub- or super-atmospheric pressure and still obtain advantages from the use of silica gel. The following table summarizes runs at super-atmospheric pressure ranging up to about 360 pounds per square inch gauge in a pressure-resistant stainless steel fluidizing column similar to that used in Examples 17–22. The urea was fed gradually over the reaction period as an atomized liquid at about 135° C. into the lower region of the fluidized column of silica gel.

Table 4
FLUIDIZED RUNS UNDER SUPERATMOSPHERIC PRESSURE

|  | Example 23 | Example 24 | Example 25 |
|---|---|---|---|
| Urea, g | 64 | 220 | 240 |
| Silica gel, g | 200 | 175 | 195 |
| $NH_3$ rate, L./min | 3 | 1 2 | (2) |
| Reaction temp., °C | 300 | 300 | 350 |
| Time at reaction temp., hr | 4 | 50 | 4 |
| Pressure, p. s. i | 150 | 360 | 80 |
| Melamine condensed from effluent, g | 20.6 | 74 | 79 |

[1] Recycled vapor effluent from which the melamine had been stripped was used as the fluidizing medium; it consisted of a mixture of 2 moles $NH_3$ per mole of $CO_2$ with traces of melamine.
[2] A portion of vapor effluent from which melamine had not been stripped was recycled as the fluidizing medium. It consisted of about $6NH_3/3CO_2/1$ melamine.

THE ADSORBENT

It has been found that virtually any inert adsorptive material of high internal surface area and/or volume can be adapted to serve as a "catalyst" in the conversion of urea and biuret to cyanamide and its polymers. The action appears to be predominantly physical, and is apparently induced best by materials of high surface area in which a considerable amount of the surface is actually in the form of the walls of innumerable submicroscopic capillaries. The activated oxide gels of the amphoteric elements qualify admirably in this respect. For example, it is well known how to prepare gels of silica and alumina such that the internal volume of a given particle is considerably more than half the apparent volume of the particle. The same techniques have been widely utilized in the past for preparing activated gels of titania, zirconia, thoria, and the like. There are also many naturally-occurring absorbents available commercially in activated form that have been found suitable. These include pumice, diatomite, infusorial earth, and the like, which inherently possess the desired amorphous silica structure and can therefore be activated by reduction of the water content. Others, such as the clays and clay-like materials, e. g., kaolin, bentonite, bauxite, and fuller's earth, are customarily activated by an acid wash prior to thermal dehydration, thereby depositing in situ on each flake or particle of material a layer of silica and/or alumina gel.

The structures of gels of silica, silica-alumina and the like can be varied by various pre-treatments to give materials having predominantly pores of a large size or any intermediate diameter from 60 to 70 A. to very low values. Also, the gels in question can have surface areas covering the range of 180–650m.$^2$/g. Gels having specific surfaces of 600 m.$^2$/g. and pore volumes of 0.9 cc./g. have been found satisfactory as have gels having surfaces of 450 m.$^2$/g. and pore volumes of 0.26 cc./g. These are not to be construed as limits of workability of the gel but only as examples of the variations in structure possible.

As normally prepared, the activated catalysts may carry 2–20% by weight of adsorbed water. It is neither necessary nor desirable to remove all of this water (as by preliminary strong heating). In fact, heating silica gel overnight in a muffle furnace at 600° C. will ordinarily remove only ½–⅔ of its adsorbed water. However, whatever water is not removed by preliminary heating is eventually nearly all removed by hydrolytic reactions with reactants on the silica, yielding $NH_3$ and $CO_2$.

While silica gel is used in most of the examples in this specification, it is to be understood that this is but representative of the general class of inert, inorganic, heat-stable, porous, adsorbent materials described as suitable in this section.

In all of the above runs biuret can be substituted for urea in amounts proportionate to the following equations:

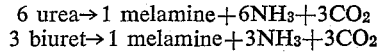

6 urea → 1 melamine + $6NH_3$ + $3CO_2$
3 biuret → 1 melamine + $3NH_3$ + $3CO_2$ Either reactant may be heated with silica gel or the like at temperatures within the range 220°–600° C. to form mixtures of cyanamide and melamine. In the range 220°–400° C. the product is mainly melamine. Above 400° C. the melamine begins to decompose to cyanamide and other products, e. g., melam, etc. It is very difficult to remove cyanamide from silica gel by strong heating, some remaining even at red heat.

The preferred temperature range for making melamine by this process is about 250°–400° C., and more preferably, 275°–350° C.

EXAMPLE 26

A mixture consisting of 20 g. urea and 40 g. silica gel predried at 400° C. was heated at 250° C. for 15 minutes in a 300 cc. titanium-lined autoclave under the autogenously produced pressure of about 300 p. s. i. The yield of melamine was 69.5%.

EXAMPLE 27

The above experiment was repeated, using silica gel predried at 650° C. The yield of melamine was 83.8%.

EXAMPLE 28

The experiment of Example 26 was repeated, using silica gel predried at 850° C. The melamine yield was 77%.

EXAMPLE 29

The experiment of Example 26 was repeated, using diatomaceous earth predried at 650° C. as the absorbent. The yield of melamine was 10%.

EXAMPLE 30

A mixture of 5 parts urea and 15 parts anhydrous silica gel was heated in an open vessel for 1.5 hours at 350° C. Melamine leached from the reaction mass was 1.33 parts, a yield of 76%.

EXAMPLE 31

A mixture of 20 g. urea and 60 g. of predried silica was heated in a 300 cc. autoclave open to the atmosphere at 300° C. for 1 hour, giving a reaction mass containing melamine in 48% yield. A similar 2-hour run gave a 73% yield.

In one modification of the invention, the urea-silica gel mixture is heated in the absence of any sweeping gas in an initial melamine-forming vessel optionally equipped with vapor exit lines for the collection of ammonia and carbon dioxide evolved. The thus-formed melamine can then be sublimed from the silica gel in a second operation.

I claim:

1. The method of preparing a reaction mass containing melamine which comprises bringing a reactant selected from the group consisting of urea and biuret into reactive contact with a silica gel under substantially atmospheric pressure and at a temperature of from about 220° to about 400° C.

2. The method which comprises combining a silica gel and urea, the urea being initially in the solid phase, into an intimate mixture and heating the admixture under substantially atmospheric pressure and at a temperature of from about 220° to about 400° C., for sufficient time to form a reaction mass comprising melamine.

3. The method which comprises combining a silica gel and urea, the urea being initially in the solid phase, into an intimate mixture and heating the admixture in the presence of added ammonia under substantially atmospheric pressure and at a temperature of from 220° to about 400° C., for sufficient time to form a reaction mass comprising melamine.

4. The method which comprises combining a silica gel and biuret, the biuret being initially in the solid phase, into an intimate mixture and heating the admixture under substantially atmospheric pressure and at a temperature of from about 220° to about 400° C., for sufficient time to form a reaction mass comprising melamine.

5. The method which comprises combining a silica gel and biuret, the biuret being initially in the solid phase, into an intimate mixture and heating the admixture in the presence of added ammonia under substantially atmospheric pressure and at a temperature of from about 220° to about 400° C., for sufficient time to form a reaction mass comprising melamine.

6. The method of preparing a reaction mass containing melamine which comprises bringing a reactant selected from the group consisting of urea and biuret into reactive contact with a silica gel and added ammonia under substantially atmospheric pressure and at a temperature of from about 220° to about 400° C.

References Cited in the file of this patent

UNITED STATES PATENTS

| | | |
|---|---|---|
| 2,500,489 | Dyer | Mar. 14, 1950 |
| 2,524,018 | Mackay | Sept. 26, 1950 |
| 2,566,231 | Paden | Aug. 28, 1951 |